US012691906B1

(12) United States Patent
Das et al.

(10) Patent No.: US 12,691,906 B1
(45) Date of Patent: Jul. 28, 2026

(54) OBJECT DETECTION AND TRACKING, INCLUDING PARALLELIZED LIDAR SEMANTIC SEGMENTATION

(71) Applicant: Zoox, Inc., Foster City, CA (US)

(72) Inventors: Subhasis Das, Menlo Park, CA (US); Benjamin Isaac Zwiebel, Burlingame, CA (US)

(73) Assignee: Zoox, Inc., Foster City, CA (US)

( * ) Notice: Subject to any disclaimer, the term of this patent is extended or adjusted under 35 U.S.C. 154(b) by 334 days.

(21) Appl. No.: 17/246,258

(22) Filed: Apr. 30, 2021

(51) Int. Cl.

| | |
|---|---|
| *B60W 60/00* | (2020.01) |
| *B60W 30/09* | (2012.01) |
| *G06F 18/214* | (2023.01) |
| *G06F 18/2415* | (2023.01) |
| *G06F 18/25* | (2023.01) |
| *G06T 7/73* | (2017.01) |
| *G06V 10/44* | (2022.01) |
| *G06V 20/58* | (2022.01) |
| *G08G 1/04* | (2006.01) |
| *G08G 1/16* | (2006.01) |

(52) U.S. Cl.
CPC ........ *B60W 60/0016* (2020.02); *B60W 30/09* (2013.01); *G06F 18/214* (2023.01); *G06F 18/2415* (2023.01); *G06F 18/251* (2023.01); *G06T 7/73* (2017.01); *G06V 10/44* (2022.01); *G06V 20/58* (2022.01); *G08G 1/04* (2013.01); *G08G 1/166* (2013.01); *B60W 2420/403* (2013.01); *B60W 2554/806* (2020.02); *G06T 2207/10028* (2013.01); *G06T 2207/30261* (2013.01)

(58) Field of Classification Search
CPC ............. B60W 60/0016; B60W 30/09; B60W 2420/42; B60W 2554/806; G06F 18/214; G06F 18/2415; G06F 18/251; G06T 7/73; G06T 2207/10028; G06T 2207/30261; G06V 10/44; G06V 20/58; G08G 1/04; G08G 1/166
See application file for complete search history.

(56) References Cited

U.S. PATENT DOCUMENTS

| | | | | |
|---|---|---|---|---|
| 2019/0145765 A1* | 5/2019 | Luo | .......................... | G01B 21/20 |
| | | | | 702/153 |
| 2019/0147372 A1* | 5/2019 | Luo | .......................... | G06N 20/00 |
| | | | | 706/20 |
| 2019/0147600 A1* | 5/2019 | Karasev | ............... | G06V 10/764 |
| | | | | 382/107 |
| 2019/0171912 A1* | 6/2019 | Vallespi-Gonzalez | ........................ | |
| | | | | G06V 10/764 |
| 2019/0220014 A1* | 7/2019 | Bradley | .................. | G06N 20/00 |
| 2020/0026277 A1* | 1/2020 | Palanisamy | ......... | B60W 60/001 |
| 2020/0172098 A1* | 6/2020 | Abrahams | ................ | G06N 3/08 |

* cited by examiner

*Primary Examiner* — Ig T An
(74) *Attorney, Agent, or Firm* — Lee & Hayes, P.C.

(57) ABSTRACT

Generating a semantic segmentation of point cloud data may include detecting an object based at least in part one or more images and using the image-based object detection in combination with the point cloud data to determine the semantic segmentation of the point cloud data. The semantic segmentation of point cloud data may be conducted in parallel with executing an object tracking component. Parallelizing these functions reduces the amount of time it takes to use sensors to detect and track objects and the point cloud semantic segmentation may provide further granularity for planning and ML model training.

20 Claims, 4 Drawing Sheets

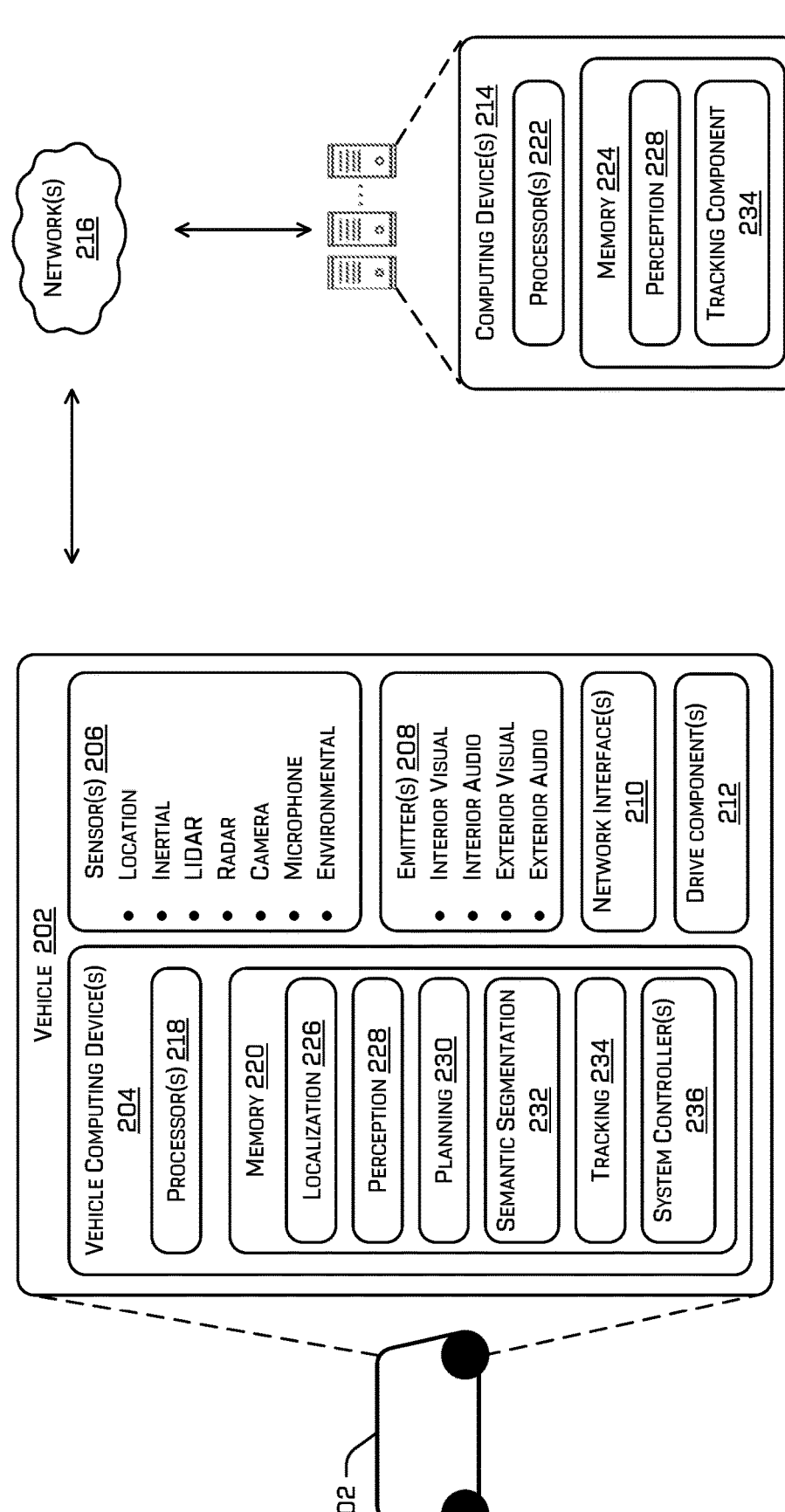

NETWORK(S)
216

COMPUTING DEVICE(S) 214

PROCESSOR(S) 222

MEMORY 224

PERCEPTION 228

TRACKING COMPONENT
234

VEHICLE 202

SENSOR(S) 206

LOCATION
INERTIAL
LIDAR
RADAR
CAMERA
MICROPHONE
ENVIRONMENTAL

EMITTER(S) 208

INTERIOR VISUAL
INTERIOR AUDIO
EXTERIOR VISUAL
EXTERIOR AUDIO

NETWORK INTERFACE(S)
210

DRIVE COMPONENT(S)
212

VEHICLE COMPUTING DEVICE(S)
204

PROCESSOR(S) 218

MEMORY 220

LOCALIZATION 226

PERCEPTION 228

PLANNING 230

SEMANTIC SEGMENTATION
232

TRACKING 234

SYSTEM CONTROLLER(S)
236

OBJECT DETECTION AND TRACKING, INCLUDING PARALLELIZED LIDAR SEMANTIC SEGMENTATION

BACKGROUND

Autonomous vehicles may use sensors to capture data regarding an environment through which the autonomous vehicles traverse. Autonomous vehicles use this sensor data to detect objects in the environment to avoid collisions. However, since autonomous vehicles may include two or more different types of sensors and the sensor data may widely vary in its format and content, the detections generated by two different sensor types may differ and such discrepancies may make it difficult to track objects and/or determine which different sensor data corresponds to a same portion of an object. Moreover, a particular type of sensor data may fail to include enough data to control the autonomous vehicle.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

FIG. 2 illustrates a block diagram of an example system comprising a perception component and tracking component.

DETAILED DESCRIPTION

Figure 1:
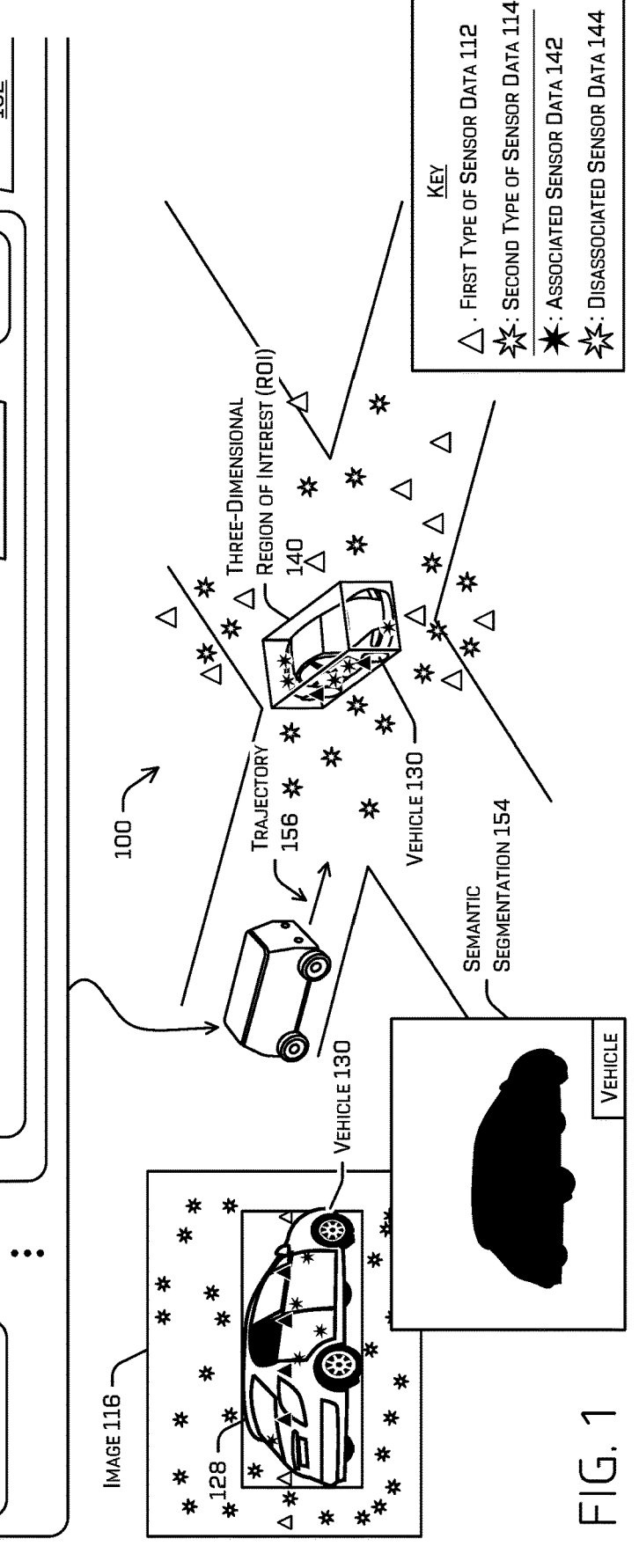
FIG. 1 illustrates an example scenario in which an autonomous vehicle configured with perception component that comprises multiple sub-components, such as a tracking component and a lidar semantic segmentation component, which may determine a probability that a lidar point and/or other type of point cloud point is associated with a semantic label.

As discussed above, discrepancies between the detections determined in association with two different sensor types may make it difficult track objects in an environment and/or efficiently control the vehicle to safely navigate the environment. This application relates to techniques for reducing the amount of time it takes to use sensors to detect and track objects in an environment associated with an autonomous vehicle and generating an object classification for three-dimensional sensor data, since an object classification isn't generated by three-dimensional sensors, such as lidar, radar, time-of-flight, or the like, and traditionally methods haven't existed to generate an object detection for three-dimensional data. For example, the techniques discussed herein determine an object classification associated with a particular three-dimensional sensor data point.

Techniques for detecting and/or tracking a current and/or previous position, velocity, acceleration, or heading of an object using sensor data may comprise determining which three-dimensional sensor data (i.e., point cloud) points are attributable to an object and/or determining a probability that a particular point cloud point is associated with a particular object classification (i.e., a semantic probability). In some examples, the probability may be binary, indicating whether or not a point cloud point is associated with a semantic label. A point cloud may include data generated by one or more sensor types, such as lidar, radar, time-of-flight, and/or the like and an object classification may be indicated by a semantic label such as "pedestrian," "vehicle," "traffic signage," or the like there may be more or less semantic labels and the semantic labels may be more specific (e.g., pickup truck, delivery truck, sedan, cyclist) or more general (e.g., dynamic object, static object). The techniques may additionally or alternatively include determining a semantic segmentation of a point cloud based at least in part on such a probability. The semantic segmentation may indicate a portion of the point cloud data that is associated with a same classification. For example, the semantic segmentation may identify the classification and may indicate the portion of the point cloud associated therewith by a mask, geometric shape that defines a region containing the portion, or the like. The semantic probability and/or the semantic segmentation may be used by a planning component of an autonomous vehicle for controlling operations of the autonomous vehicle and/or to train machine-learned (ML) components of the autonomous vehicle.

A point cloud segmentation, such as a first lidar point cloud semantic segmentation that identifies which lidar points are associated with pedestrians, a second lidar point cloud semantic segmentation that identifies which lidar points are associated with vehicles, a radar semantic segmentation that identifies a portion of radar data associated with vehicles, etc., may improve the safety and efficacy of an autonomous vehicle. For example, the granularity of such a point cloud segmentation may be finer than an image segmentation and/or may include depth data that may or may not exist for an image segmentation. This extra granularity and/or depth information may improve operation of a planning component of the vehicle that controls operations of the vehicle, such as motion of the vehicle, passenger-related operations (e.g., opening a door, rolling down a window, turning on an HVAC system), etc. Moreover, this extra granularity and/or depth information may be used as additional training data for training an image classification ML model, training a monocular depth estimation model (see U.S. patent application Ser. No. 15/970,838, filed May 3, 30218 and granted Jul. 28, 2020 as U.S. Pat. No. 10,726,567), and/or training an ML model that directly determines a classification associated with point cloud data.

The techniques may additionally or alternatively comprise tracking an object, which may include determining whether to associate a current object detection generated from recently received (e.g., current) sensor data with a previous object detection generated from formerly received sensor data. In other words, a track may identify that an object detected in former sensor data is the same object detected in current sensor data. In some examples, the track may additionally or alternatively comprise various current and/or previous data about the object useful for a planning component of an autonomous vehicle to predict motion/behavior of the object and to determine a trajectory and/or path for controlling the autonomous vehicle. For example, the track may additionally or alternatively comprise an indication of region(s) of the environment currently and/or previously occupied by the object, an object classification associated with the object (e.g., a vehicle, an oversized vehicle, a pedestrian, a cyclist), a current and/or previous heading associated with the object, a current and/or previous velocity and/or acceleration of the object, and/or a current position and/or velocity of the object, etc.

In some examples, determining to associate an object with a previously generated track or to generate a new track in association with the object may be based at least in part on a tracking machine-learned (ML) model, as discussed in more detail in U.S. application Ser. No. 16/779,576, filed Jan. 31, 2020, and/or U.S. application Ser. No. 16/866,865, filed May 5, 2020, both of which are incorporated by reference herein in their entirety for all purposes. In some examples, such a tracking ML model may be trained to generate an environment representation based at least in part on the outputs of one or more pipelines associated with different sensor types. In some examples, one or more sensors of a sensor type may be associated with a pipeline (e.g., a series of operations; steps; networks or layers thereof; machine learned models; hardware such as analog-to-digital converters, amplifiers, field-programmable gate array(s) (FPGA(s)), application-specific integrated circuit(s) (ASIC(s), and/or the like), etc.) used to determine information about objects contained in the associated sensor data) associated with that sensor type. For simplicity, the collective outputs of a pipeline are referred to herein as an environment representation. An environment representation may comprise one or more object detections and may comprise one or more output types. For example, a vision pipeline may output an environment representation based at least in part on vision data (e.g., sensor data comprising one or more RGB images, thermal images).

The environment representation may comprise an object detection, which may include an indication and/or a likelihood that a portion of the environment is occupied by an object, a region of interest (ROI) (e.g., a bounding box, a mask, a segmentation, or some other identification that a region of the environment is occupied by an object) associated with a detected object, an object classification of the object, a heading of the object, a velocity and/or acceleration of the object, a height of the object, and/or the like. The environment representation may additionally or alternatively comprise a voxelized representation of the sensor data (a discretized three-dimensional representation of such data) and/or top-down segmentation, as discussed in more detail in U.S. patent application Ser. No. 15/963,833, filed Apr. 26, 2018 and granted May 12, 2020 as U.S. Pat. No. 10,649,459, which is incorporated by reference in its entirety herein for all purposes, and/or a top-down representation of the environment. In some examples, additional environment representation(s) may be generated by perception pipeline(s) associated with different sensor type(s).

The tracking component discussed herein may output a finalized environment representation based at least in part on the different environment representations generated by the different perception pipelines. The finalized environment representation may be associated with a 60-meter area around the vehicle, although smaller or larger sizes are contemplated. For example, the finalized environment representation may be associated with a 60 meter by 60 meter square of the environment associated with the autonomous vehicle. In yet another example, the area may be a circle having a radius of 60 meters. Any other shape may be used and may be dependent on the perception data itself.

In some examples, multiple object detections may be generated in association with a same object in the environment. These multiple object detections may be generated by different perception pipelines, which may be associated with different sensor types. For example, a lidar perception pipeline may receive lidar data and determine an object detection associated with an object, a hybrid lidar-vision perception pipeline may receive lidar and vision data and generate a different object detection associated with the same object, a vision perception pipeline may receive image(s) from a camera and generate an additional object detection associated the same object, and so on. Due to differences between the sensors and perception pipelines, object detections associated with a same object generated by different pipelines may vary between each other. For example, a first object detection generated by a first perception pipeline may indicate an ROI associated with an object that has different dimensions that an ROI indicated by a second object detection generated by a second perception pipeline associated with a same object. In a more drastic case, one pipeline may generate an object detection associated with an object and another pipeline may not generate a detection at all. For example, a radar or lidar pipeline may detect an object but the object may be occluded from a camera's field of view.

The tracking ML model discussed herein may receive an aggregation of at least a portion of environment representations associated with different sensor types as input and may be trained to output an estimated object detection based at least in part on the aggregated data. In some examples, the aggregated data may be represented in a multi-channel image, where different channels may be associated with different sensor types from which the perception data was generated and/or different types of perception data. For example, the aggregated data may comprise a lidar, vision, and/or radar occupancy grid (e.g., a grid having a discrete portion, such as a pixel, that indicates whether a corresponding location in the environment is occupied or unoccupied according to the perception pipeline associated with the respective sensor data type); a top-down representation of an ROI generated in association with lidar, vision, and/or radar; an object classification associated with a portion of the environment; a probability that a portion of the environment is occupied; and/or the like.

In some examples, the tracking ML model may operate in parallel with a semantic segmentation component that determines the semantic probability associated with a point cloud point and/or a semantic segmentation associated with a point cloud. Operating the tracking ML, model and the semantic segmentation component in such a configuration may reduce a latency of a perception component of the vehicle, which may reduce errors generated by the perception component and/or may decrease response time, thereby improving the safety and efficacy of an autonomous vehicle. In an additional or alternate example, the tracking ML model may operate partially in parallel, but may receive a point cloud semantic segmentation as input as part of the aggregated data.

The techniques discussed herein may improve the safety of a vehicle by improving the vehicle's ability to detect precise portions of the environment that are occupied by an object, predict movement and/or behavior of objects in the vehicle's surroundings, and/or continue to account for objects that may be temporarily occluded. The techniques may also increase the operating range of the perception system (e.g., increased to 40 meters, 60 meters, or 80 meters from the vehicle). The techniques may increase the accuracy of object detection (e.g., object location, segmentation) and/or tracking by determining a probability that a particular point cloud point is associated with a classification and/or by determining a semantic segmentation associated with a point cloud.

Example Scenario

FIG. 1 illustrates an example scenario 100 including a vehicle 102. In some instances, the vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 102 may be a fully or partially autonomous vehicle having any other level or classification. It is contemplated that the techniques discussed herein may apply to more than robotic control, such as for autonomous vehicles. For example, the techniques discussed herein may be applied to mining, manufacturing, augmented reality, etc. Moreover, even though the vehicle 102 is depicted as a land vehicle, vehicle 102 may be a spacecraft, watercraft, and/or the like. In some examples, vehicle 102 may be represented in a simulation as a simulated vehicle. For simplicity, the discussion herein does not distinguish between a simulated vehicle and a real-world vehicle. References to a "vehicle" may therefore reference a simulated and/or a real-world vehicle.

According to the techniques discussed herein, the vehicle 102 may receive sensor data from sensor(s) 104 of the vehicle 102. For example, the sensor(s) 104 may include a location sensor (e.g., a global positioning system (GPS) sensor), an inertia sensor (e.g., an accelerometer sensor, a gyroscope sensor, etc.), a magnetic field sensor (e.g., a compass), a position/velocity/acceleration sensor (e.g., a speedometer, a drive system sensor), a depth position sensor (e.g., a lidar sensor, a radar sensor, a sonar sensor, a time of flight (ToF) camera, a depth camera, an ultrasonic and/or sonar sensor, and/or other depth-sensing sensor), an image sensor (e.g., a camera), an audio sensor (e.g., a microphone), and/or environmental sensor (e.g., a barometer, a hygrometer, etc.).

In at least one example, the sensor data may comprise at least image data 106 and data that may be represented as a point cloud, which may be received from one or more types of sensors. For example, sensor data that may be represented as a point cloud may include radar data 108, lidar data 110, and/or any other sensor data from which a point cloud may be constructed, such as ToF data, ultrasonic data, stereo camera data, etc. Sensors from which point clouds may be generated may be configured to measure a depth from the sensor to a surface and/or infer such a depth, as in the case of stereo cameras. A point of a point cloud may be a three (or more)-dimensional point that corresponds to a discrete location in the environment surrounding the autonomous vehicle. Points of the point cloud may be represented using any of a variety of coordinate systems (e.g., Euclidean, polar, spherical, cylindrical). However, it is contemplated that a point of the point cloud may comprise less than three dimensions in some instances (e.g., where one dimension is assumed, a two-dimensional plane is being scanned for objects).

FIG. 1 illustrates a first point cloud of a first type of sensor data 112 (e.g., radar data 108) represented as triangles, a second point cloud of a second type of sensor data 114 (e.g. lidar data 110) represented as stars, and an image 116 that is an example of image data 106. In some examples, a point cloud may comprise between one and thousands or even hundreds of thousands of points, therefore it is understood that the illustrated point clouds are merely a small portion of the potential number of points that may be received from sensor(s) 104. In an additional or alternate example, sensor data received from different sensor types may be combined into a single point cloud.

In some examples, the autonomous vehicle 102 may include computing device(s) 118 that may include a perception component 120 and/or a planning component 122, all or some of which may receive sensor data from sensor(s) 104. The sensor(s) 104 may generate sensor data, which may be received by computing device(s) 118. However, in other examples, some or all of the sensor(s) 104 and/or computing device(s) 118 may be separate from and/or disposed remotely from the vehicle 102 and data capture, processing, commands, and/or controls may be communicated to/from the vehicle 102 by one or more remote computing devices via wired and/or wireless networks.

In general, the perception component 120 may determine what is in the environment surrounding the autonomous vehicle 102 and the planning component 122 may determine how to operate the autonomous vehicle 102 according to information received from the perception component 120 regarding the environment. The perception component 120 may include one or more ML models and/or other computer-executable instructions for detecting, identifying, segmenting, classifying, and/or tracking objects from sensor data collected from the environment of the autonomous vehicle 102. For example, the perception component 120 may comprise the ML architectures discussed herein for determining a probability that a point cloud point is associated with a classification, a semantic segmentation of a point cloud, environment representation(s), and/or a track.

The ML models discussed herein may include a neural network, such as a random forest and/or boosted ensemble of decision trees; a directed acyclic graph (DAG) (e.g., where the nodes are organized as a Bayesian network); deep learning algorithm(s), such as artificial neural networks (ANN) (e.g., recurrent neural network (RNN), 'residual neural network (ResNet)), deep belief network (DBN), deep stacking network (DSN); etc.

In some examples, a first ML model 124 of the perception component 120 may be trained to receive sensor data from sensor(s) 104 of the autonomous vehicle 102 and output an object detection 126 for any objects in the environment that correspond with classification for which the first ML model 124 has been trained. For example, the first ML model 124 may be a computer vision component that detects objects from image data 106 and outputs the object detection 126 to identify a representation of the object within an image and/or the object's relation to the autonomous vehicle (e.g., a spatial relation). In some examples, the object detection 126 may comprise an ROI associated with the object's representation in an image (e.g., a rectangle encompassing the representation of the object in the image comprising a center, extent, and/or orientation, such as a yaw, a roll, and/or pitch); a mask identifying salient pixels or other portions of the image associated with the object), a classification associated with the object (e.g., pedestrian, vehicle, cyclist, traffic signage, blocking vehicle), key locomotor points of a pedestrian (e.g., head, shoulder, waist, elbow, wrist, knee, foot) or other articulating object, a movement state associated with an object (e.g., walking, running, standing, sitting, lying), depth estimate and/or depth probability distribution associated with the ROI, a segmentation associated with the representation of the object in an image (e.g., a semantic segmentation), and/or any other computer vision information related to the representation of the object in an image and/or the spatial data about the object that may be inferred from the image.

In the illustrated example, the first ML model 124 may receive image 116 and generate ROI 128, which is a two-dimensional ROI, as part of an object detection 126 associated with vehicle 130.

In some examples, the first ML model 124 may additionally or alternatively determine a track of the object. In some examples, the track may associate a current detected position of an object and a previously detected position of an object and/or a current, predicted, and/or historical position, heading, velocity, acceleration, distance, ROI(s), and/or center of the object. The track may thereby be an indication that the first ML model 124 is identifying two object detections as corresponding to a same object.

In some examples, the perception component 120 may additionally or alternatively comprise a pre-processing component 132 that receives sensor data from the sensor(s) 104. In some examples, the pre-processing component 132 may comprise software and/or hardware that receives signal(s) from depth-sensing sensors such as, for example, a radar sensor, lidar sensor, and/or other type of depth sensor. Generally, the pre-processing component 132 may be configured to preliminarily generate point clouds from signals received from the depth sensors, determine a subset of the point clouds to associate with each object detection 126 generated by the first ML model 124, and/or translate coordinates of the subset from a sensor coordinate space to an image space and/or a modified image space where a "z-axis" of the image space extends through a center of an ROI of the object detection and the "x-" and "y-" axes. The pre-processing component 132 may generate a point cloud in association with each type of sensor. In some examples, the pre-processing component 132 may combine the point clouds of different types of sensors into a single point cloud, although in other examples, the pre-processing component 132 may separate and/or identify points of a point cloud according to sensor type. Whether a single point cloud or multiple point clouds, the point cloud(s) may be provided to a second ML model 134 as part of multi-modal input data 136.

In some examples, the second ML model 134 may include the ML architecture discussed in U.S. patent application Ser. No. 16/386,249, filed Apr. 16, 2019, the entirety of which is incorporated by reference herein for all purposes. The second ML model 134 may determine a depth estimate and/or depth probability distribution associated with an object detection determined from image data. In some examples, the second ML model 134 may comprise a pipeline per type of point cloud sensor type. So, in an example where the second ML model 134 is trained to output a velocity associated with an object based on lidar and radar data, the second ML model 134 may comprise two pipelines. It is contemplated that the second ML model 134 may comprise more or less pipelines (e.g., 1, 3, 4, 5, or more). In such an example, each pipeline may receive spatial and/or non-spatial data associated with the respective sensor type.

In an additional or alternate example, the second ML model 134 may comprise one pipeline for combined spatial data (e.g., an accumulated point cloud of all the depth sensors' data, so both lidar and radar points in the example above) plus one pipeline per sensor type to handle each sensor's non-spatial data (e.g., radar cross section (RCS), doppler, doppler variance, SNR, and/or range top-down segmentation box, semantic segmentation, instance segmentation, object classification associated with the object detection and/or a pixel thereof, and/or ROI orientation (e.g., yaw)). The multi-modal input data 136 may additionally or alternatively comprise non-spatial information. Of course, the second ML model 134 may comprise multiple models each receiving differing input and providing an associated output and/or one or more models having multiple heads. In at least some examples in which multiple output heads are used, the model may improve output associated with one modality based on parameters of a shared portion of the model learn from various other sensor modalities.

The second ML model 134 may be trained to output, in association with object detection 126, a velocity of the detected object, future center of the detected object, point cloud association(s) 138, and/or a three-dimensional ROI 140. For example, the velocity may comprise a speed and/or direction of the vehicle 130 within the environment associated with the vehicle 102. In some examples, another (unillustrated) component of the perception component 120 may compute the future center of the detected object based at least in part on the velocity and a current center indicated by the three-dimensional ROI 140. In some examples, the center may be a center of gravity, a geometric center of the three-dimensional ROI 140, and/or the like.

The point cloud association(s) 138 identify a subset of point cloud data that is attributable to the object/object detection 126 for each type of depth-sensing sensor for which the second ML model 134 is trained. In the depicted example, a point cloud association may have been generated in association with ROI 140. Sensor data that is identified by the point cloud association as being associated with the vehicle 130 is shaded (142), whereas sensor data that is not identified by the point cloud association as being associated with the vehicle remains unshaded (144). In some examples, the perception component 120 may determine whether to associate sensor data with an object detection based at least in part on a probability associated with the point meeting or exceeding a threshold probability.

Though omitted FIG. 1 for clarity and as otherwise noted above, the second machine learning model 134 may additionally or alternatively receive any other data derived from the sensor data including, but not limited to, track data (e.g., indicating a previous, current, and/or predicted object position, velocity, acceleration, heading), classification data, doppler measurements (or estimates, regressions, etc.) associated with the object, and/or any other perception data.

The perception component 120 may further comprise a tracking component 146 and a semantic segmentation component 148. The tracking component 146 may receive one or more environment representations and/or object detections from respective perception pipelines (e.g., vision pipeline, lidar pipeline, hybrid vision-lidar pipeline, radar pipeline, hybrid vision-lidar-radar pipeline, and/or the like) and determine whether or not to associate a formerly generated track with a current object detection or to generate a new track in association with a current object detection. The tracking component 146 may additionally or alternatively determine a final environment representation and/or an estimated object detection that may act as a summary of the different object detections. In some examples, the tracking component 146 discussed herein may determine an estimated object detection by inputting object detections and/or environment representations generated by one or more sensor types (e.g., discrete sensor types such as lidar, RGB camera, thermal image, sonar, radar; and/or hybrid sensor types such as vision-lidar association, lidar-radar association) into the ML model discussed herein that is trained to output a final environment representation that may comprise an estimated object detection. In some examples, if a degree of association (e.g., an intersection over union (IOU), a score based at least in part on a size and/or feature comparison) of the estimated object detection to a projection of the previous track meets or exceeds a threshold, the estimated object detection may be associated with the previous track, instead of basing the determination on the raw object detections. If the IOU is less than the threshold, the raw object detection may be included in the determination. The tracking component 146 is discussed in further detail in FIG. 3 and in U.S. patent application Ser. No. 16/779,576, filed Jan. 31, 2020, the entirety of which is incorporated by reference herein.

Ultimately, the tracking component 146 may output a track 150 in association with a detected object. In some examples, the track 150 may associate a current object detection with one or more previous object detections and/or may indicate data related thereto, such as a velocity, acceleration, heading, object classification, unique identifier, occlusion status (e.g., whether the object is currently/previously occluded partially or totally from one or more sensors). In another example where the track 150 is determined to be associated with an object that has newly been detected, the current object detection may be the only object detection associated with the track 150.

The semantic segmentation component 148 may determine a probability that a three-dimensional point sensor data point is associated with an object classification. Additionally or alternatively, the semantic segmentation component 148 may use such a probability to determine a three-dimensional semantic segmentation 152 for three-dimensional sensor data such as lidar data, radar data, time-of-flight data, and/or the like. In some examples, the semantic segmentation component 148 may use part of the object detection 126, the point cloud association(s) 138, and/or the three-dimensional ROI 140 to determine the probability and/or the semantic segmentation component 148. As discussed in further detail herein, the semantic segmentation component 148 may use a semantic segmentation 154 generated by the first ML model 124 as part of the object detection 126, i.e., an image-based semantic segmentation 154, to determine a probability associated with a particular three-dimensional sensor data point.

In some examples, determining the probability associated with a three-dimensional point cloud point, such as a lidar point or radar point, may be based at least in part on projecting the point cloud point into the coordinate space associated with the (two-dimensional) semantic segmentation 154 and determining whether the projected point coincides with a positive identification of the existence of an object having the semantic label identified by the semantic segmentation 154, i.e., the black region in the semantic segmentation 154. In some examples, the probability may be binary, indicating whether or not a point cloud point is associated with a semantic label based at least in part on the projection. The probability may be further based at least in part on the point cloud association(s) 138 and/or the three-dimensional ROI 140. For example, the semantic segmentation component 148 may comprise an ML model trained to regress the probability, which may be a likelihood (i.e., a posterior probability), based at least in part on whether the projected three-dimensional point lies within the semantic segmentation 154, whether the three-dimensional point is associated with the object according to the point cloud association(s) 138, and/or whether the three-dimensional point is within the three-dimensional ROI 140.

In some examples, the semantic segmentation component 148 may additionally determine a three-dimensional semantic segmentation 152 associated with the three-dimensional data based at least in part on the probability. For example, the semantic segmentation component 148 may determine a volume that contains all or a defined percentage of three-dimensional points associated with probabilities that meet or exceed a threshold probability. For example, the volume may be a shape that contains 95% of lidar points associated with a probability, as determined as discussed above, that meets or exceeds a threshold probability of being associated with an object associated with a particular semantic label, such as "vehicle," "pedestrian," "delivery truck," "dynamic object," etc.

The data produced by the perception component 120, including the output(s) of the first ML model 124, the second ML model 134, the tracking component 146, and/or the semantic segmentation component 148, may be collectively referred to as "perception data." Once the perception component 120 has generated perception data, the perception component 120 may transmit at least part of the perception data, including the track 150, the probability(ies) determined by the semantic segmentation component 148, and/or the three-dimensional semantic segmentation 152 to the planning component 122.

The planning component 122 may use the perception data received from perception component 120, to determine one or more trajectories, control motion of the vehicle 102 to traverse a path or route, and/or otherwise control operation of the vehicle 102, though any such operation may be performed in various other components (e.g., localization may be performed by a localization component, which may be based at least in part on perception data). For example, the planning component 122 may determine a route for the vehicle 102 from a first location to a second location; generate, substantially simultaneously and based at least in part on the perception data and/or simulated perception data (which may further include predictions regarding detected objects in such data), a plurality of potential trajectories for controlling motion of the vehicle 102 in accordance with a receding horizon technique (e.g., 1 micro-second, half a second) to control the vehicle to traverse the route (e.g., in order to avoid any of the detected objects); and select one of the potential trajectories as a trajectory 156 of the vehicle 102 that may be used to generate a drive control signal that may be transmitted to drive components of the vehicle 102. FIG. 1 depicts an example of such a trajectory 156, represented as an arrow indicating a heading, velocity, and/or acceleration, although the trajectory itself may comprise instructions for controller(s) of the vehicle 102, which may, in turn, actuate a drive system of the vehicle 102.

Example System

FIG. 2 illustrates a block diagram of an example system 200 that implements the techniques discussed herein. In some instances, the example system 200 may include a vehicle 202, which may represent the vehicle 102 in FIG. 1. In some instances, the vehicle 202 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 202 may be a fully or partially autonomous vehicle having any other level or classification. Moreover, in some instances, the techniques described herein may be usable by non-autonomous vehicles as well.

The vehicle 202 may include a vehicle computing device(s) 204, sensor(s) 206, emitter(s) 208, network interface(s) 210, and/or drive component(s) 212. Vehicle computing device(s) 204 may represent computing device(s) 118 and sensor(s) 206 may represent sensor(s) 104. The system 200 may additionally or alternatively comprise computing device(s) 214.

In some instances, the sensor(s) 206 may represent sensor(s) 104 and may include lidar sensors, radar sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors, etc.), etc. The sensor(s) 206 may include multiple instances of each of these or other types of sensors. For instance, the radar sensors may include individual radar sensors located at the corners, front, back, sides, and/or top of the vehicle 202. As another example, the cameras may include multiple cameras disposed at various locations about the exterior and/or interior of the vehicle 202. The sensor(s) 206 may provide input to the vehicle computing device(s) 204 and/or to computing device(s) 214.

The vehicle 202 may also include emitter(s) 208 for emitting light and/or sound, as described above. The emitter(s) 208 in this example may include interior audio and visual emitter(s) to communicate with passengers of the vehicle 202. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 208 in this example may also include exterior emitter(s). By way of example and not limitation, the exterior emitter(s) in this example include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 202 may also include network interface(s) 210 that enable communication between the vehicle 202 and one or more other local or remote computing device(s). For instance, the network interface(s) 210 may facilitate communication with other local computing device(s) on the vehicle 202 and/or the drive component(s) 212. Also, the network interface (s) 210 may additionally or alternatively allow the vehicle to communicate with other nearby computing device(s) (e.g., other nearby vehicles, traffic signals, etc.). The network interface(s) 210 may additionally or alternatively enable the vehicle 202 to communicate with computing device(s) 214. In some examples, computing device(s) 214 may comprise one or more nodes of a distributed computing system (e.g., a cloud computing architecture).

The network interface(s) 210 may include physical and/or logical interfaces for connecting the vehicle computing device(s) 204 to another computing device or a network, such as network(s) 216. For example, the network interface(s) 210 may enable Wi-Fi-based communication such as via frequencies defined by the IEEE 200.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s). In some instances, the vehicle computing device(s) 204 and/or the sensor(s) 206 may send sensor data, via the network(s) 216, to the computing device(s) 214 at a particular frequency, after a lapse of a predetermined period of time, in near real-time, etc.

In some instances, the vehicle 202 may include one or more drive components 212. In some instances, the vehicle 202 may have a single drive component 212. In some instances, the drive component(s) 212 may include one or more sensors to detect conditions of the drive component(s) 212 and/or the surroundings of the vehicle 202. By way of example and not limitation, the sensor(s) of the drive component(s) 212 may include one or more wheel encoders (e.g., rotary encoders) to sense rotation of the wheels of the drive components, inertial sensors (e.g., inertial measurement units, accelerometers, gyroscopes, magnetometers, etc.) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive component(s) 212. In some cases, the sensor(s) on the drive component(s) 212 may overlap or supplement corresponding systems of the vehicle 202 (e.g., sensor(s) 206).

The drive component(s) 212 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 212 may include a drive component controller which may receive and preprocess data from the sensor(s) and to control operation of the various vehicle systems. In some instances, the drive component controller may include one or more processors and memory communicatively coupled with the one or more processors. The memory may store one or more components to perform various functionalities of the drive component(s) 212. Furthermore, the drive component(s) 212 may also include one or more communication connection(s) that enable communication by the respective drive component with one or more other local or remote computing device(s).

The vehicle computing device(s) 204 may include processor(s) 218 and memory 220 communicatively coupled with the one or more processors 218. Computing device(s) 214 may also include processor(s) 222, and/or memory 224. The processor(s) 218 and/or 222 may be any suitable processor capable of executing instructions to process data and perform operations as described herein. By way of example and not limitation, the processor(s) 218 and/or 222 may comprise one or more central processing units (CPUs), graphics processing units (GPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 220 and/or 224 may be examples of non-transitory computer-readable media. The memory 220 and/or 224 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 220 and/or memory 224 may store a localization component 226, perception component 228, planning component 230, semantic segmentation component 232, tracking component 234, and/or system controller(s) 236. Perception component 228 may represent perception component 120, planning component 230 may represent planning component 122, semantic segmentation component 232 may represent semantic segmentation component 148, and/or tracking component 234 may represent tracking component 146. The memory 220 may additionally or alternatively comprise map(s), which are unillustrated.

In at least one example, the localization component 226 may include hardware and/or software to receive data from the sensor(s) 206 to determine a position, velocity, and/or orientation of the vehicle 202 (e.g., one or more of an x-, y-, z-position, roll, pitch, or yaw). For example, the localization component 226 may include and/or request/receive map(s) of an environment and can continuously determine a location, velocity, and/or orientation of the autonomous vehicle within the map(s). In some instances, the localization component 226 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some instances, the localization component 226 may provide data to various components of the vehicle 202 to determine an initial position of an autonomous vehicle for generating a trajectory and/or for generating map data, as discussed herein. In some examples, localization component 226 may provide, to the tracking component 232, a location and/or orientation of the vehicle 202 relative to the environment and/or sensor data associated therewith.

In some instances, perception component 228 may comprise a primary perception system and/or a prediction system implemented in hardware and/or software. The perception component 228 may comprise one or more perception pipelines that may detect object(s) in in an environment surrounding the vehicle 202 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, and/or acceleration associated with an object), and/or the like. Data determined by the perception component 228 is referred to as perception data.

The planning component 230 may receive a location and/or orientation of the vehicle 202 from the localization component 226 and/or perception data from the perception component 228 and may determine instructions for controlling operation of the vehicle 202 based at least in part on any of this data. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic) that the system controller(s) 236 and/or drive component(s) 212 may parse/cause to be carried out, second instructions for the emitter(s) 208 may be formatted according to a second format associated therewith).

The semantic segmentation component 232 and/or tracking component 234 may operate on the vehicle 202 and/or on the computing device(s) 214. In some examples, the semantic segmentation component 232 and/or tracking component 234 may be upstream (provide input to) from the planning component 230 in a pipeline and downstream (receive input) from at least some components of at least part of the perception component 228, although the semantic segmentation component 232 and/or tracking component 234 may themselves be sub-portions of pipelines of the perception component 120. The semantic segmentation component 232 and/or tracking component 234 may be configured to pass all, part, or none of the outputs thereof to the planning component 230.

In some examples, the semantic segmentation component 232 and/or tracking component 234 may comprise respective ML models. For example, the tracking component 234 may comprise the ML model discussed herein that determines a final environment representation, which may comprise an estimated object detect. The tracking component 234 may additionally or alternatively comprise a first component that receives an estimated object detection generated by the ML model and at least one "raw" object detection generated in association with a sensor type (e.g., one of the inputs to the ML model) and/or a second component that receives estimated object detection and one or more object detections associated with a track. At any rate, first component and/or the second component of the tracking component may determine whether or not to associate an estimated object detection with a track or to generate a new track in association with an object detection. The tracking component 234 may additionally or alternatively output a velocity, heading, and/or other historic or current characteristics of one or more object detections, all or part of which may be at least part of a track.

The memory 220 and/or 224 may additionally or alternatively store a mapping system (e.g., generating a map based at least in part on sensor data), a planning system, a ride management system, etc. Although localization component 226, perception component 228, planning component 230, semantic segmentation component 232, tracking component 234, and/or system controller(s) 236 are illustrated as being stored in memory 220, any of these components may include processor-executable instructions, machine-learned model(s) (e.g., a neural network), and/or hardware and all or part of any of these components may be stored on memory 224 or configured as part of computing device(s) 214.

As described herein, the localization component 226, the perception component 228, the planning component 230, semantic segmentation component 232, tracking component 234, and/or other components of the system 200 may comprise one or more ML models. For example, the localization component 226, the perception component 228, the planning component 230, semantic segmentation component 232, and/or tracking component 234 may each comprise different ML model pipelines. In some examples, an ML model may comprise a neural network. An exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, and the like. In some examples, the ML model discussed herein may comprise PointPillars, SECOND, top-down feature layers (e.g., see U.S. patent application Ser. No. 15/963,833, which is incorporated by reference in its entirety herein for all purposes), and/or VoxelNet. Architecture latency optimizations may include MobilenetV2, Shufflenet, Channelnet, Peleenet, and/or the like. The ML model may comprise a residual block such as Pixor, in some examples.

Memory 220 may additionally or alternatively store one or more system controller(s) 236, which may be configured to control steering, propulsion, braking, safety, emitters, communication, and other systems of the vehicle 202. These system controller(s) 236 may communicate with and/or control corresponding systems of the drive component(s) 212 and/or other components of the vehicle 202. For example, the planning component 230 may generate instructions based at least in part on perception data generated by the perception component 228, and may validate and the perception data/or transmit the instructions to the system controller(s) 236. The system controller(s) 236 may control operation of the vehicle 202 based at least in part on the instructions received from the planning component 230.

It should be noted that while FIG. 2 is illustrated as a distributed system, in alternative examples, components of the vehicle 202 may be associated with the computing device(s) 214 and/or components of the computing device(s) 214 may be associated with the vehicle 202. That is, the vehicle 202 may perform one or more of the functions associated with the computing device(s) 214, and vice versa.

Example System

Figure 3:
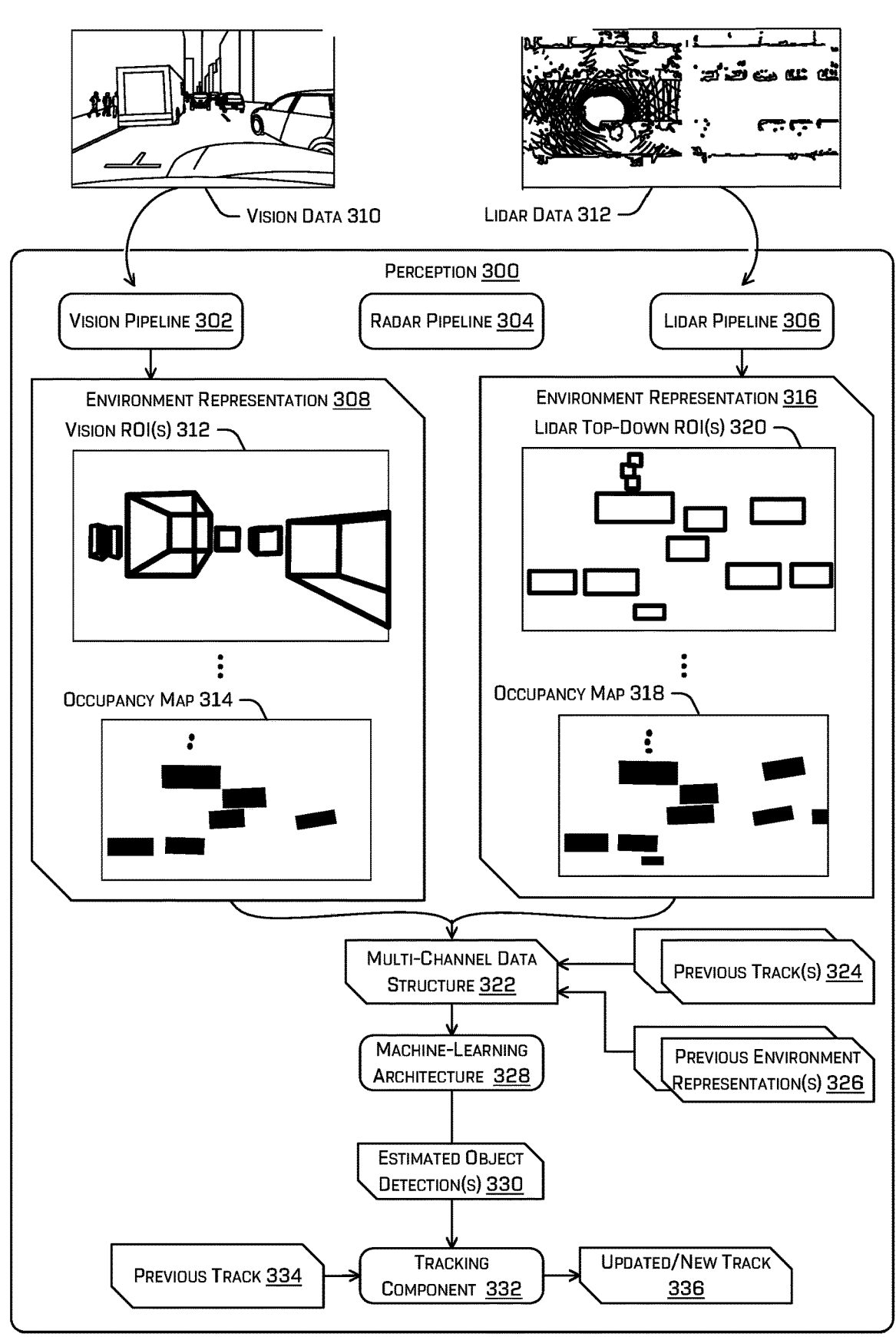
FIG. 3 illustrates a block diagram of a subcomponent of a perception architecture, the subcomponent configured to track object(s).

FIG. 3 illustrates a block diagram of an example tracking system 300 for determining an estimated object detection from one or more object detections received from disparate perception pipelines and/or determining an updated or new track based at least in part on the estimated object detection. The example tracking system 300 may represent the tracking component 146 and/or some other elements of the perception component 120. Example tracking system 300 may comprise any number of pipelines for determining characteristics of the surroundings of the tracking system 300. For example, the pipeline(s) may determine what is in an environment of an autonomous vehicle and/or the sensor(s) and/or characteristics of objects in the environment. FIG. 3 depicts three pipelines: a vision pipeline 302, a radar pipeline 304, and a lidar pipeline 306, although any number and types of pipeline(s) are contemplated. For example, a pipeline may be associated with a same type of sensor (e.g., one or more cameras, one or more lidar sensors, one or more radar sensors), a direction of field of view (e.g., one or more cameras having an overlapping field of view), multiple types of sensors (e.g., a hybrid vision-lidar pipeline), data from other sources (e.g., data from a remote computing device, map data stored in memory), and/or the like.

Regardless, a pipeline of the one or more pipelines may be configured to receive sensor data and determine one or more outputs. For simplicity, the collective outputs of a pipeline are referred to herein as an environment representation. An environment representation may comprise one or more object detections and may comprise one or more output types. For example, a vision pipeline 302 may output an environment representation 308 based at least in part on vision data 310 (e.g., sensor data comprising one or more RGB images, thermal images). The environment representation 308 generated by the vision pipeline 302 may comprise one or more object detections, wherein at least one of the object detections comprises:

a two-dimensional ROI associated with an object;

a three-dimensional ROI associated with the object, such as one of those depicted at 312 as described in more detail in U.S. patent application Ser. Nos. 15/970,838 and 16/386,249, the entirety of which are incorporated by reference herein for all purposes (in some examples, the three-dimensional ROI may additionally or alternatively indicate a pose comprising a position and/or orientation of an object, including a yaw of the object);

a depth estimate (e.g., an estimate of the distance from a sensor/vehicle to the object) associated with the object and/or ROI as discussed in U.S. patent application Ser. No. 15/970,838;

a height of the object as discussed in U.S. patent application Ser. No. 15/970,838;

an object classification and/or likelihood associated with the object, the likelihood indicating a posterior probability that the sensor data is associated with object of the type specified by the object classification (e.g., vehicle, pedestrian, articulated vehicle, animal, child) in some examples, the object classification and/or likelihood may be associated with a discrete portion of sensor data such as a pixel;

an indication that an object classified as a pedestrian or animal is standing, walking, or running;

an indication of a state (e.g., turn indication, stop indication, warning indication) and/or location of brake or other indicator light associated with a vehicle, motorcycle, and/or the like (e.g., headlights, side mirror lights);

a vision embedding;

a position (e.g., a center and/or extents) of the object relative to a representation of the environment (e.g., a voxelization of the environment, a mesh representation of the environment);

a pose of the object, which may comprise the position and/or heading of the object;

an occupancy map 314 (e.g., whether there is an object occupying a pixel/voxel, an instance segmentation), which may comprise a portion indicated as being occupied by the object; and/or an occlusion grid (e.g., comprising a probability that a portion of the environment is occluded from a line of sight to one or more of the vision sensors).

In some examples, although a vision pipeline may classify a motorcyclist as a pedestrian or a cyclist, the object classification associated therewith may be modified, in accordance with the techniques presented herein, to indicate that the object is a motorcyclist based at least in part on a track associated with the motorcyclist. For example, the track may indicate that the motorcyclist is moving faster than a pedestrian or cyclist could move and the object classification may therefore be revised. Similarly, class information may be associated with the track. In such an instance, prior class information associated with the class (e.g., from one or more previous times) may be used to further increase a confidence whether an object classification output from the vision pipeline should be changed. Of course, such a modification may be an output of a component, performed based on a component, subcomponent, or other algorithm which receives perception classification and track information as input, or otherwise.

A radar pipeline 304 may determine an environment representation (unillustrated to conserve drawing space) comprising:

an occupancy map, which may comprise a portion indicated as being occupied by the object;

a radar detection (which may, in some examples, be rasterized into a representation of the environment, such as a three-dimensional representation or a top-down representation);

an occlusion grid (e.g., comprising a probability that a portion of the environment is occluded from a line of sight to one or more of the radar sensors), as discussed in more detail in U.S. patent application Ser. No. 16/407,139, the entirety of which is incorporated by reference herein;

a yaw rate associated with an object, as discussed in more detail in U.S. patent application Ser. No. 16/416,686, the entirety of which is incorporated by reference herein;

a velocity associated with an object (e.g., a ground-based range rate associated with an object);

radar cross section (RCS); and/or a ROI and/or object classification.

A lidar pipeline 306 may determine an environment representation 316 comprising:

an occupancy map 318, which may comprise a portion indicated as being occupied by the object;

an occlusion grid (e.g., comprising a probability that a portion of the environment is occluded from a line of sight to one or more of the lidar sensors);

an ROI and/or object classification associated with an object; and/or a top-down segmentation (e.g., a top-down indication of whether a portion of the environment is occupied and/or top-down ROI (e.g., such as the lidar top-down ROI(s) depicted at 320), as discussed in more detail in U.S. patent application Ser. No. 15/963,833, which is incorporated by reference herein for all purposes.

The pipelines illustrated and discussed regarding FIG. 3 are merely examples. The tracking system 300 may comprise more, less, and/or different pipelines than those illustrated and discussed herein. Moreover, the pipelines may be intermixed instead of being neatly separate as depicted. For example, at least some of the environment representations discussed above may be a product of part of two different pipelines. Note that in the depicted example, due to the limited space and the enlargement of the vision environment representation and the lidar environment representation for the clarity thereof, particular details regarding a radar environment representation are not depicted, although a radar pipeline and radar environment representation are additionally or alternatively contemplated.

The various environment representations produced by the different pipelines may be aggregated into a multi-channel data structure 322. For example, this aggregating may comprise projecting the data into a common representation of the environment, such as a voxel space, a mesh representation, or the like in a common reference frame and/or having same dimensions. The aggregating may additionally or alternatively comprise determining a top-down representation of one or more parts of an environment representation, such as projecting a three-dimensional ROI into a two-dimensional ROI from a top-down perspective and/or determining a top-down two-dimensional ROI based at least in part on a two-dimensional ROI associated with a sensor-perspective, a depth, and/or an object classification. In some examples, the multi-channel data structure 322 may comprise a multi-channel image, where each channel of the image may be associated with a different pipeline and/or a different type of output (e.g., occupancy map, occlusion grid, ROI, object classification). For example, a first channel of the image may comprise pixels indicating whether respective portions of the environment are occupied/unoccupied as determined by a vision pipeline, a second channel of the image may comprise pixels indicating whether respective portions of the environment are occupied/unoccupied as determined by a lidar pipeline, a third channel may comprise pixels indicating whether respective portions of the environment are associated with a certain object classification, and so on.

The multi-channel data structure 322 may comprise an output of one or more perception pipelines and/or data received from other sources (e.g., from a memory of an autonomous vehicle, from a remote computing device). For example, the multi-channel data structure 322 may comprise an environment representation that may comprise a top-down representation of an environment (e.g., which may be two, three-, or higher-dimensional), an occupancy map of the environment, a representation of an occluded portion of the environment, an ROI associated with an object, an object classification associated with the object, a sensor data segmentation, a three-dimensional discretized representation of sensor data, a yaw and/or yaw rate associated with the object, a velocity and/or acceleration associated with the object, a set of extents (e.g., dimensions) associated with the object, and/or a ground height estimation, as discussed in more detail in U.S. patent application Ser. No. 16/698,055, filed Nov. 27, 2019, which is incorporated by reference herein in its entirety.

As used herein an object detection may be a portion of one or more environment representations that indicate the existence of an object, such as an ROI, a positive occupancy indication, an object classification, etc.

In some examples, previous track(s) 324 and/or previous environment representation(s) 326 may be part of the multi-channel data structure 322 or otherwise provided as input to the ML architecture 328. For example, the previous track(s) 324 and/or previous environment representation(s) 326 may be associated with a last n (where n is a positive integer) time steps at which environment representations were generated by the pipeline(s) and/or tracks were determined. For example, the system may be synchronized to determine environment representations and/or tracks at or by a time interval (e.g., every 10 milliseconds, every 100 milliseconds, every 500 milliseconds). The track(s) and/or environment representation(s) that were determined at the previous n number of time steps. In an additional or alternate example, for example where the perception system is semi-synchronized or un-synchronized, the previous track(s) 324 and/or previous environment representation(s) 326 may be associated with a time window. For example, this data may be accumulated, on a rolling basis, over a 2 second period, a 3 second period, 5 second period, and/or any other time window suitable for the application.

The multi-channel data structure 322 may be provided as input to the ML architecture 328, which may be trained to determine a final environment representation comprising one or more estimated object detection(s) 330. For example, the ML architecture 328 may determine a top-down representation of the environment comprising an indication that a portion of the environment is occupied, an ROI and/or object classification associated with the occupied portion (e.g., an object), an orientation of the object (e.g., yaw and/or yaw/heading bin), a velocity associated with the object (e.g., stationary/moving indication, a lateral and/or longitudinal velocity, yaw rate), a height associated with the object, and/or a predicted ROI associated with a future time step. In some examples, the final environment representation may be a multi-channel data structure, such as an image, where the different image channels indicate the different values discussed above, although in additional or alternate examples, the estimated object detection(s) 330 may be output in a unique data structure, such as a data structure used in association with tracks, tensors, or otherwise. In some instances, an estimated object detection may be associated with one or more portions (e.g., pixels, regions) of the final environment representation and, in at least one example, each of the one or more portions may indicate a velocity associated with the object. In the latter example, the techniques may comprise determining a final velocity and/or yaw rate associated with the object based at least in part on the velocities indicated by the one or more portions.

The final environment representation and/or the estimated object detection(s) 330 thereof may be provided as input to a tracking component 332. Tracking component 332 may be trained and/or configured to determine whether to associate an estimated object detection with a previous track 334, a new track, or to forward one or more object detections from the pipeline(s) and/or an estimated object detection 330 to a contingent tracking component. In some examples, the tracking component 332 may output an update or new track 336 to a planning component based at least in part on the determination discussed herein.

In some examples, the contingent tracking component may be a tracking component configured to receive the raw environment representations from the pipeline(s) and determine a track therefrom. The contingent tracking component may, in some cases, require more compute and/or memory since the contingent tracking component uses more data between the different pipelines to determine whether an object detection is a false positive and/or whether to associate an object detection with a former track or a new track.

Example Process

Figure 4:
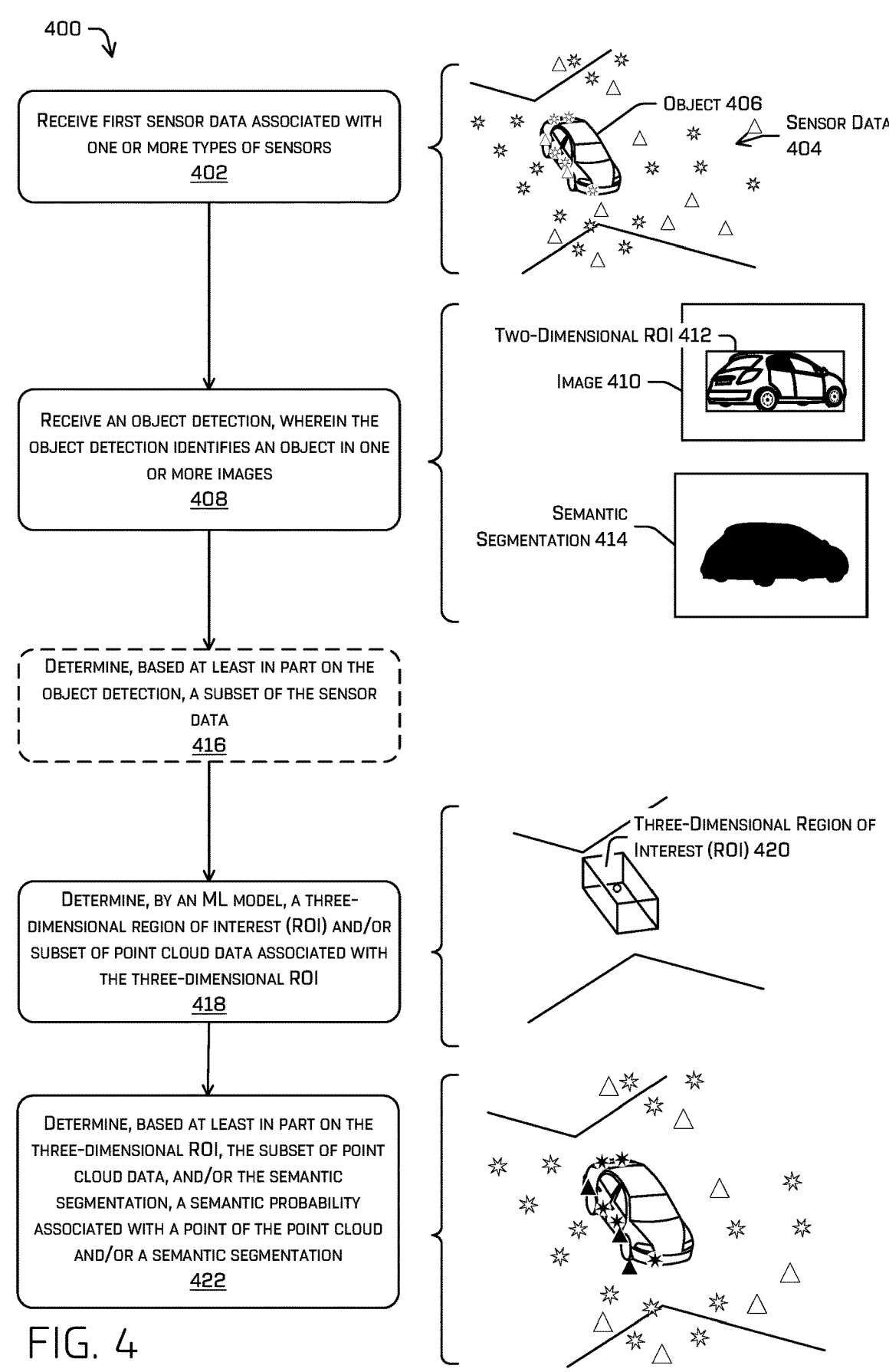
FIG. 4 illustrates a pictorial flow diagram of an example process for determining a probability that a point cloud point is associated with a semantic label and/or generating a point cloud semantic segmentation. This probability and/or semantic segmentation may be determined in parallel with the operations of a tracking machine-learned model.

FIG. 4 illustrates a pictorial flow diagram of an example process 400 for determining a probability that a point cloud point is associated with a semantic label and/or generating a point cloud semantic segmentation. This probability and/or semantic segmentation may be determined in parallel with the operations of a tracking machine-learned model. In some examples, example process 400 may be accomplished by a segmentation component of the perception component. In some examples, the segmentation component may execute in parallel, synchronously or asynchronously, with example tracking system 300, which may reduce the overall latency of the perception component or a subcomponent thereof that comprises the segmentation component and the example tracking system 300.

At operation 402, example process 400 may comprise receiving sensor data associated with one or more types of sensors, the sensor data including an image and point cloud data. In some examples, the point cloud data may comprise one or more two-or-more-dimensional points associated with sensor data received from one or more sensor types. For example, the point cloud data may comprise three-dimensional lidar points and/or points determined from radar data. FIG. 4 illustrates the point cloud 404 as triangles and stars to represent point cloud points associated with two different types of sensor data and an object 406.

At operation 408, example process 400 may comprise receiving an object detection associated with a first sensor type, according to any of the techniques discussed herein. For example, the object detection may identify an object in one or more images, such as image 410. To identify the object, the object detection may include a two-dimension region of interest 412, a semantic segmentation 414 (depicted as a mask that identifies particular pixels that are associated with the classification "vehicle" in the depicted example), a confidence associated with the ROI, etc. The semantic segmentation 414 may be a semantic segmentation

414 generated by an ML model trained to output semantic segmentations using images; in other words, the semantic segmentation 414 may be an image-based semantic segmentation 414. The image-based semantic segmentation 414 may be determined by a first ML model based at least in part on image data.

At operation 416, example process 400 may comprise determining, based at least in part on the object detection, a subset of the sensor data, according to any of the techniques discussed herein. Operation 416 is depicted using dashed lines since operation 416 may be part of operation 408, i.e., the subset of sensor data may be identified by the first ML model, although in an additional or alternate example, operation 416 may be a distinct operation. In an example where operation 416 is distinct, operation 416 may include projecting three-dimensional sensor data into the two-dimensional ROI 412 and/or the semantic segmentation 414 to determine the subset based at least in part on projected sensor data that lies within the two-dimensional ROI 412 and/or the semantic segmentation 414. In yet another example, operation 416 may be part of operation 418.

At operation 418, example process 400 may comprise determining, by an ML model, a three-dimensional region of interest (ROI) 420 and/or a subset of a point cloud associated with the three-dimensional ROI 420, according to any of the techniques discussed herein. The ML model of operation 418 may be a second ML model that may determine the three-dimensional ROI 420 and the point cloud associations, as discussed above. The point cloud associations may be used as the subset of point cloud data or, in another example, any point cloud points within the three-dimensional ROI may be used as the subset of point cloud data for the following operation(s). In an additional or alternate example, a lidar pipeline (e.g., lidar pipeline 308) may determine a subset of the point cloud data that is associated with the object. Such a subset may be at least one of the outputs of the lidar pipeline 308.

At operation 422, example process 400 may comprise determining, based at least in part on the three-dimensional ROI 420, the subset of point cloud data, and/or the semantic segmentation 414, a semantic probability associated with a point of the point cloud and/or a semantic segmentation. The term semantic probability is a simplification of the probability that a point cloud point is associated with an object that is associated with a particular semantic label, such as "vehicle," "delivery truck," "sedan," "dynamic object," or the like, depending on the granularity with which such labels are defined. In some examples, operation 422 may comprise determining a probability for a subset or all of the point cloud points in the three-dimensional region of interest 420 or that are identified by a point cloud association. Additionally or alternatively, operation 422 may comprise determining a probability that a point is associated with a semantic label for multiple labels, resulting in multiple probabilities being associated with a same point. For the sake of simplicity, the examples given herein only regard determining a semantic probability and/or a semantic segmentation for a single semantic label, i.e., the label "vehicle." In some examples, the probability may be binary, i.e., the probability may be a value indicating that a point cloud is or is not associated with a semantic label/classification.

Determining the semantic probability associated with a three-dimensional point cloud point, such as a lidar point or radar point, may be based at least in part on projecting the point cloud point into the coordinate space associated with the (two-dimensional) semantic segmentation 414 and determining whether the projected point is located at a position in the semantic segmentation 414 identified as being associated with an object of the semantic label type, i.e., the black region in the semantic segmentation 414. The probability may be further based at least in part on the subset of point cloud data and/or the three-dimensional ROI 420 determined at operation 418. For example, the semantic segmentation component may comprise an ML model trained to regress the probability based at least in part on whether the projected three-dimensional point is located at a point in the semantic segmentation 414 that is identified as being positively associated with a semantic label, whether the three-dimensional point is part of the subset of point cloud data, and/or whether the three-dimensional point is within the three-dimensional ROI 420.

Operation 422 may additionally or alternatively comprise determining a three-dimensional semantic segmentation associated with the point cloud based at least in part on the probability. For example, the semantic segmentation component may determine a volume that contains all or a defined percentage of three-dimensional points of the point cloud associated with probabilities (as determined at operation 422 for each of the points) that meet or exceed a threshold probability. For example, the volume may be a shape that contains 95% of lidar points associated with a probability, as determined as discussed above, that meets or exceeds a threshold probability of being associated with an object associated with a particular semantic label, such as "vehicle," "pedestrian," "delivery truck," "dynamic object," etc.

Example Clauses

A. A method comprising: receiving sensor data, wherein the sensor data comprises image data and lidar data; receiving, based at least in part on the image data data, an object detection indicating a classification of an object and a portion of the image data associated with the object in an environment associated with a vehicle; determining, based at least in part on at least one of the image data or the lidar data and by a first machine-learned model, a subset of lidar points associated with the object; determining, by a first component of a perception component associated with the vehicle and based at least in part on the subset of lidar points and the classification, a first lidar point of the set of lidar points is associated with the classification and the object; determining, based at least in part on the object detection and by a second component of the perception component, an updated track associated with the object, wherein the updated track indicates an association of the object detection with a track indicating at least one of an estimated previous position of the object, a previous region of interest, or a previous velocity of the object, wherein the first component and the second component operate in parallel; and controlling the vehicle based at least in part on the updated track, the probability, and the first lidar point.

B. The method of paragraph A, wherein a second machine-learned model determines the classification based at least in part on the image data.

C. The method of either paragraph A or B, further comprising: determining, by a second machine-learned model and based at least in part on at least one of the image data, the lidar data, or a three-dimensional region of interest received from a third machine learned model trained to generate the three-dimensional region of interest based at least in part on the image data and the lidar data, a probability that the first lidar point of the set of lidar points is associated with the classification; determining a semantic segmentation based at least in part on the set of lidar points and the probability, wherein: the semantic segmentation identifies a volume that contains a subset of the lidar points that is associated with the classification; and determining the semantic segmentation comprises determining to include the first lidar point in the subset of lidar points based at least in part on determining that the probability meets or exceeds a probability threshold.

D. The method of any one of paragraphs A-C, wherein: the object detection is a first object detection associated with a first sensor type, the first sensor type being a type of camera; and the method further comprising: receiving a second object detection associated with a second sensor type, the first object detection and the second object detection identifying the object; receiving the track associated with the object, the track identifying at least one of the estimated previous position of the object, the previous region of interest, or the previous velocity of the object; inputting the first object detection, the second object detection, and at least part of the track into a second machine-learned model, wherein the third machine-learned model is at least part of the second component; receiving, from the second machine-learned model, a data structure comprising a region of interest and object classification associated with the object; and determining, by the second component, the updated track associated with the object based at least in part on the data structure, the updated track comprising at least a portion of the track, a current position, and region of interest.

E. The method of paragraph D, wherein the second machine-learned model is trained to output a grid associated with an area in the environment having a minimum distance of greater than thirty meters from the vehicle to any point on an edge of the area.

F. The method of any one of paragraphs A-E, wherein: the classification is associated with a pixel of the image data; and determining the probability comprises projecting the first lidar point into the image data as a projected lidar point and determining that the first lidar point is associated with a portion of the image data identified by the semantic segmentation as being associated with the classification.

G. A system comprising: one or more processors; and a memory storing processor-executable instructions that, when executed by the one or more processors, cause the system to perform operations comprising: receiving sensor data, wherein the sensor data comprises image data and point cloud data; receiving, based at least in part on at least one of the image data or the point cloud data, an object detection indicating a classification of an object and a portion of the image data associated with the object in an environment associated with a vehicle; determining, based at least in part on at least one of the image data or the lidar data and by a first machine-learned model, a subset of lidar points associated with the object; determining, based at least in part on the subset of lidar points and the classification, a probability that a first lidar point of the set of lidar points is associated with the classification and the object; and controlling the vehicle based at least in part on an indication that the first lidar point is associated with the classification.

H. The system of paragraph G, wherein the point cloud data comprises at least one of lidar data, radar data, or time-of-flight data.

I. The system of either paragraph G or H, wherein a second machine-learned model determines the classification based at least in part on the image data.

J. The system of any one of paragraphs G-I, wherein the operations further comprise: determining, by a second machine-learned model and based at least in part on at least one of the image data, the lidar data, or a three-dimensional region of interest received from a third machine learned model trained to generate the three-dimensional region of interest based at least in part on the image data and the lidar data, a probability that the first lidar point of the set of lidar points is associated with the classification; determining a semantic segmentation based at least in part on the set of lidar points and the probability, wherein: the semantic segmentation identifies a volume that contains a subset of the lidar points that is associated with the classification; and determining the semantic segmentation comprises determining to include the first lidar point in the subset of lidar points based at least in part on determining that the probability meets or exceeds a probability threshold.

K. The system of any one of paragraphs G-J, wherein: the object detection is a first object detection associated with a first sensor type, the first sensor type being a type of camera; and the operations further comprise: receiving a second object detection associated with a second sensor type, the first object detection and the second object detection identifying the object; receiving a track associated with the object, the track identifying at least one of an estimated previous position of the object, a previous region of interest, or a previous velocity of the object; inputting the first object detection, the second object detection, and at least part of the track into a second machine-learned model; receiving, from the second machine-learned model, a data structure comprising a region of interest and object classification associated with the object, the pose indicating at least one of a position or a yaw associated with the object; and determining an updated track associated with the object based at least in part on the data structure, the updated track comprising at least a portion of the track, a current position, and the region of interest.

L. The system of paragraph K, wherein the second machine-learned model is trained to output a grid associated with an area in the environment having a minimum distance of more than thirty meters from the vehicle to any point on an edge of the area.

M. The system of either paragraph K or L, wherein: determining the that the first lidar point is associated with the classification is accomplished by a first component of the vehicle; determining the updated track is accomplished by a second component of the vehicle; and the first component and the second component operate in parallel.

N. The system of any one of paragraphs G-M, wherein: the classification is associated with a pixel of the image data; and determining that the first lidar point is associated with the classification comprises projecting the first lidar point into the image data as a projected lidar point and determining that the first lidar point is associated with a portion of the image data identified by the semantic segmentation as being associated with the classification.

O. A non-transitory computer-readable medium storing processor-executable instructions that, when executed by one or more processors, cause the one or more processors to perform operations comprising: receiving sensor data, wherein the sensor data comprises image data and point cloud data; receiving, based at least in part on at least one of the image data or the point cloud data, an object detection indicating a classification of an object and a portion of the image data associated with the object in an environment associated with a vehicle; determining, based at least in part on at least one of the image data or the lidar data and by a first machine-learned model, a subset of lidar points associated with the object; determining, based at least in part on the subset of lidar points and the classification, a probability that a first lidar point of the set of lidar points is associated with the classification and the object; and controlling the vehicle based at least in part on an indication that the first lidar point is associated with the classification.

P. The non-transitory computer-readable medium of paragraph O, wherein a second machine-learned model determines the classification based at least in part on the image data.

Q. The non-transitory computer-readable medium of either paragraph O or P, wherein the operations further comprise: determining, by a second machine-learned model and based at least in part on at least one of the image data, the lidar data, or a three-dimensional region of interest received from a third machine learned model trained to generate the three-dimensional region of interest based at least in part on the image data and the lidar data, a probability that the first lidar point of the set of lidar points is associated with the classification; determining a semantic segmentation based at least in part on the set of lidar points and the probability, wherein: the semantic segmentation identifies a volume that contains a subset of the lidar points that is associated with the classification; and determining the semantic segmentation comprises determining to include the first lidar point in the subset of lidar points based at least in part on determining that the probability meets or exceeds a probability threshold.

R. The non-transitory computer-readable medium of any one of paragraphs O-Q, wherein: the object detection is a first object detection associated with a first sensor type, the first sensor type being a type of camera; and the operations further comprise: receiving a second object detection associated with a second sensor type, the first object detection and the second object detection identifying the object; receiving a track associated with the object, the track identifying at least one of an estimated previous position of the object, a previous region of interest, or a previous velocity of the object; inputting the first object detection, the second object detection, and at least part of the track into a second machine-learned model; receiving, from the second machine-learned model, a data structure comprising a region of interest and object classification associated with the object, the pose indicating at least one of a position or a yaw associated with the object; and determining an updated track associated with the object based at least in part on the data structure, the updated track comprising at least a portion of the track, a current position, and the region of interest S. The non-transitory computer-readable medium of paragraph R, wherein: determining the that the first lidar point is associated with the classification is accomplished by a first component of the vehicle; determining the updated track is accomplished by a second component of the vehicle; and the first component and the second component operate in parallel.

T. The non-transitory computer-readable medium of any one of paragraphs O-S, wherein: the classification is associated with a pixel of the image data; and determining that the first lidar point is associated with the classification comprises projecting the first lidar point into the image data as a projected lidar point and determining that the first lidar point is associated with a portion of the image data identified by the semantic segmentation as being associated with the classification.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

At least some of the processes discussed herein are illustrated as logical flow graphs, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art. Note that the term substantially may indicate a range. For example, substantially simultaneously may indicate that two activities occur within a time range of each other, substantially a same dimension may indicate that two elements have dimensions within a range of each other, and/or the like.

Many variations and modifications may be made to the above-described examples, the elements of which are to be understood as being among other acceptable examples. All such modifications and variations are intended to be included herein within the scope of this disclosure and protected by the following claims.

What is claimed is:

1. A method comprising:
receiving sensor data, wherein the sensor data comprises image data and lidar data comprising three-dimensional lidar points;
determining, based on the image data, an object detection indicating:
   a portion of the image data that is associated with an object in an environment being traversed by a vehicle, and
   a first object classification associated with the portion;
determining, based on projecting a first lidar point of the three-dimensional lidar points to a two-dimensional space associated with the image data, a projected lidar point in the two-dimensional space;
determining, based at least in part on whether the projected lidar point falls within the portion of the image data, a probability that the first lidar point is associated with the first object classification;
determining, based at least in part on the probability meeting or exceeding a probability threshold, that the first lidar point is included in a subset of the three-dimensional lidar points that is associated with the first object classification,
   wherein the subset of the three-dimensional lidar points is determined based on projecting the subset to the two-dimensional space associated with the image data;
determining a three-dimensional region of interest (ROI) that includes a threshold portion of the subset of the three-dimensional lidar points; and
controlling the vehicle based at least in part on the three-dimensional ROI.

2. The method of claim 1, wherein determining the object detection comprises:
determining, by a machine-learned model and based on the image data as input, the portion of the image data and the first object classification.

3. A system comprising:
one or more processors; and
a memory storing processor-executable instructions that, when executed by the one or more processors, cause the system to perform operations comprising:
   receiving sensor data, wherein the sensor data comprises image data and point cloud data;
   receiving an object detection associated with an object in an environment being traversed by a vehicle, the object detection indicating:
      a portion of the image data associated with the object, and
      a first object classification associated with the object; and
   determining, based on projecting a first point of the point cloud data, from a three-dimensional space associated with the point cloud data into a two-dimensional space associated with the image data, a probability that the first point is associated with the first object classification;
determining, based at least in part on the probability meeting or exceeding a probability threshold, that the first point is included in a subset of points of the point cloud data that is associated with the first object classification,
   wherein the subset of the points is determined based on projecting the subset to the two-dimensional space associated with the image data;
determining a three-dimensional region of interest (ROI) that includes a threshold portion of the subset of the points; and
controlling the vehicle based at least in part on the three-dimensional ROI.

4. The system of claim 3, wherein the point cloud data comprises at least one of lidar data, radar data, or time-of-flight data.

5. The system of claim 3, wherein the object detection is a first object detection and the image data is captured by a first sensor type,
the operations further comprising:
receiving a second object detection based at least in part on a second sensor type, the first object detection and the second object detection identifying the object;
receiving a previous track associated with the object, the previous track identifying at least one of an estimated previous position of the object, a previous region of interest, or a previous velocity of the object;
inputting the first object detection, the second object detection, and at least part of the previous track into a machine-learned model; and
receiving, from the machine-learned model, a data structure comprising a region of interest and a second object classification associated with the object; and
determining, based at least in part on the data structure and a current position of the object, a current track associated with the object.

6. The system of claim 5, wherein the machine-learned model is trained to output a grid associated with an area in the environment having a minimum distance of more than thirty meters from the vehicle to any point on an edge of the area.

7. The system of claim 5, wherein:
determining the probability is accomplished by a first component of the vehicle;
determining the current track is accomplished by a second component of the vehicle; and
the first component and the second component operate in parallel.

8. The system of claim 3, determining the probability comprises:
determining a projected point in the two-dimensional space corresponding to the first point; and
determining that the projected point falls within the portion of the image data associated with the first object classification.

9. A non-transitory computer-readable medium storing processor-executable instructions that, when executed by one or more processors, cause the one or more processors to perform operations comprising:
receiving sensor data, wherein the sensor data comprises image data and point cloud data representing an environment associated with a vehicle;

determining, an object detection indicating a classification of an object in the environment and a portion of the image data associated with the object, wherein the classification includes an identification of an object type;

determining, based on projecting a first point of the point cloud data into a two-dimensional space associated with the image data, a probability that the first point is associated with the classification;

determining, based at least in part on the probability meeting or exceeding a probability threshold, that the first point is included in a subset of points of the point cloud data that is associated with the classification, wherein the subset of the points is determined based on projecting the subset to the two-dimensional space associated with the image data;

determining a three-dimensional region of interest (ROI) that includes a threshold portion of the subset of the points; and controlling the vehicle based at least in part on the three-dimensional ROI.

10. The non-transitory computer-readable medium of claim 9, wherein:

the classification of the object is determined by a machine-learned model based at least in part on the image data as input, and determining the probability is based on determining that projection of the first point falls within the portion of the image data.

11. The non-transitory computer-readable medium of claim 9, wherein the object detection is a first object detection and the image data is captured by a first sensor type, the operations further comprising:

receiving a second object detection associated with a second sensor type, the first object detection and the second object detection identifying the object;

receiving a previous track associated with the object, the track identifying at least one of an estimated previous position of the object, a previous region of interest, or a previous velocity of the object;

inputting the first object detection, the second object detection, and at least part of the previous track into a second machine-learned model; and receiving, from the second machine-learned model, a data structure comprising a region of interest and object classification associated with the object; and determining, based at least in part on the data structure and a current position of the object, a current track associated with the object.

12. The non-transitory computer-readable medium of claim 11, wherein:

determining the probability is accomplished by a first component of the vehicle;

determining the track is accomplished by a second component of the vehicle; and the first component and the second component operate in parallel.

13. The method of claim 1, wherein the probability is determined by a first component of a perception component associated with the vehicle, the method further comprising:

determining, based at least in part on the object detection and by a second component of the perception component, a track associated with the object, wherein determining the probability and determining the track are separately executed in parallel by the first component and the second component.

14. The method of claim 13, wherein:

the track is a first track associated with a first time, and the probability is determined based at least in part on a second track associated with the object, the second track determined at a second time prior to the first time.

15. The system of claim 3, wherein the probability is a first probability determined at a first time, the operations further comprising:

accessing a second probability, determined at a second time prior to the first time, the second probability indicative of a position being associated with the object, wherein the first probability is determined at least in part on the second probability.

16. The system of claim 15, wherein the second probability is determined based at least in part on a track associated with the object, the track including an estimated position of the object or a velocity of the object.

17. The system of claim 3, the operations further comprising:

determining a track associated with the object, wherein the track associates the object detection with one or more previous object detections, wherein the controlling the vehicle is further based at least in part on the track.

18. The system of claim 3, wherein determining the probability is based on determining whether the projected first point is located at a position, in the two-dimensional space, that is within an area of the two-dimensional space corresponding to the portion of the image data associated with the object.

19. The non-transitory computer-readable medium of claim 9, the operations further comprising:

determining, in parallel with determining the probability, a track associated with the object, wherein the track associates the object detection with one or more previous object detections, wherein the controlling the vehicle is further based at least in part on the track.

20. The non-transitory computer-readable medium of claim 9, wherein determining the probability is based on determining whether the projected first point is located at a position, in the two-dimensional space, that is within an area of the two-dimensional space corresponding to the portion of the image data associated with the object.

* * * * *